United States Patent [19]

O'Hara et al.

[11] Patent Number: 5,418,774

[45] Date of Patent: May 23, 1995

[54] OPTICAL HEAD SYSTEM AND ITS OPTICAL DISC

[75] Inventors: Shunji O'Hara, Higashiosaka; Takashi Ishida, Osaka; Sadao Mizuno, Ibaragi; Noboru Ito, Hirakata, all of Japan

[73] Assignee: Matsushita Electric Industrial Co., Ltd., Osaka, Japan

[21] Appl. No.: 117,554

[22] Filed: Sep. 7, 1993

Related U.S. Application Data

[63] Continuation of Ser. No. 666,664, Mar. 8, 1991, abandoned.

[30] Foreign Application Priority Data

Mar. 23, 1990 [JP] Japan ................................ 2-73735

[51] Int. Cl.$^6$ .............................................. G11B 7/013
[52] U.S. Cl. .................................. 369/275.3; 369/111; 369/47
[58] Field of Search .................. 369/275.3, 275.4, 195, 369/199, 111, 47, 48, 50; 360/72.2, 74.1

[56] References Cited

U.S. PATENT DOCUMENTS

| | | | |
|---|---|---|---|
| 3,911,489 | 10/1975 | Spence et al. | 360/72.2 |
| 4,663,678 | 5/1987 | Blum | 360/72.2 |
| 4,740,947 | 4/1988 | Ohta et al. | 369/286 |
| 4,873,679 | 10/1989 | Murai et al. | 369/32 |
| 4,910,722 | 3/1990 | Kaji et al. | 369/32 |
| 5,051,848 | 9/1991 | Ishii et al. | 360/32 |
| 5,093,819 | 3/1992 | Kimura | 369/48 |

*Primary Examiner*—Aristotelis Psitos
*Assistant Examiner*—Duncan Wilkinson
*Attorney, Agent, or Firm*—Wenderoth, Lind & Ponack

[57] ABSTRACT

An optical head system designed to accomplish an information recording and/or reproduction from opposite disc surfaces of an optical disc with the use of a single light source. The optical head system comprises a source of light for providing a linearly polarized beam of light; a collimator lens for collimating the linearly polarized beam of light into a collimated beam of light; a polarizing direction rotating unit for arbitrarily varying a direction of linear polarization of said beam of light; a polarizing beam splitter for dividing the beam, whose direction of linear polarization has been varied, into first and second beam components; and objective lenses for focusing the first and second beam components into respective pencils of light which are projected onto first and second, opposite disc surfaces of an optical disc or one disc surfaces of respective first and second optical discs.

3 Claims, 5 Drawing Sheets

OPTICAL HEAD SYSTEM AND ITS OPTICAL DISC

This application is a Continuation of now abandoned application, Ser. No. 07/666,664, filed Mar. 8, 1991, abandoned.

BACKGROUND OF THE INVENTION

1. Field of the Invention

The present invention relates to an disc and an optical head for optically recording and/or reproducing information on and from the optical disc by radiating a beam of semiconductor laser light to the optical disc.

2. Description of the Prior Art

Figure 12:
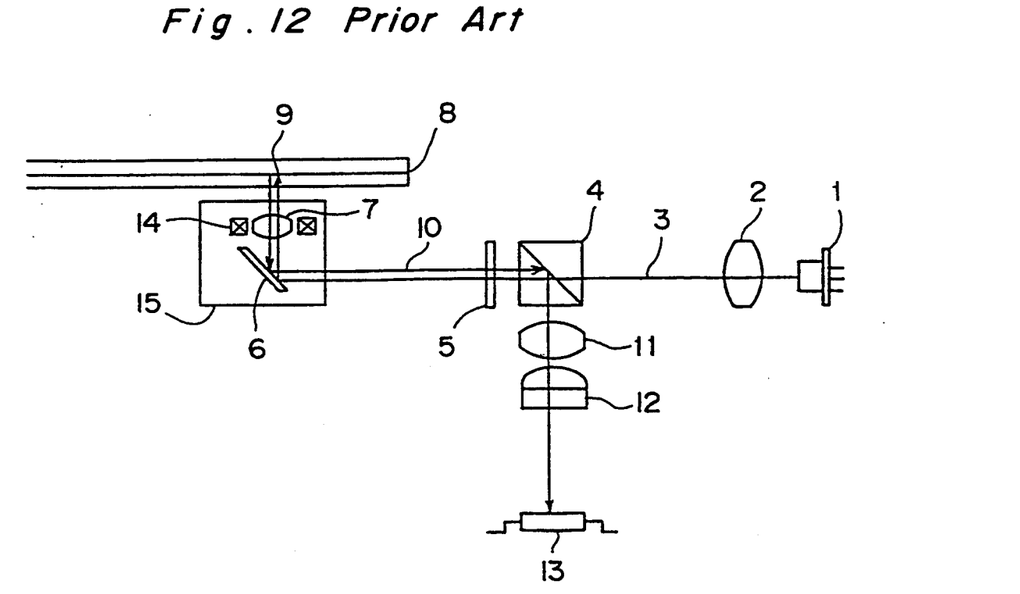
FIG. 12 is a schematic side view of the prior art optical head system.

As an optical head system used in an optical recording and/or reproducing apparatus for recording or reproducing information on and from a recording-medium such as, for example, an optical disc, with the use of a semiconductor laser, such a system as shown in FIG. 12 of the accompanying drawings is well known. Referring to FIG. 12 showing a side view of the prior art optical head system, rays of light emitted from a semiconductor laser 1 are converted by a collimator lens 2 into a collimated laser beam 3. This collimated laser beam 3 enters a polarized beam splitter 4 in the form of P-polarized light and is, after having passed through a ¼ wavelength plate 5, deflected by a mirror 6 so as to travel towards an optical disc 8 in a direction substantially perpendicular thereto. The laser beam is, before it impinges upon the optical disc 8, focused by an objective lens 7 to form a light spot 9 which is subsequently projected onto the optical disc 8.

A laser beam 10 reflected from the optical disc 8 travels towards the ¼ wavelength plate 5 through the objective lens 7 and then is reflected the mirror 6. As the laser beam 10 passes through the ¼ wavelength plate 5, it is transformed into an S-polarized beam which is subsequently reflected by the polarized beam splitter 4 so as to travel towards a photodetector 13 after having passed through a sensor lens 11 and then converged by a cylindrical lens 12. The photodetector 13 detects not only a reproduced signal, reproduced from the optical disc, but also a focusing signal and a tracking signal in a known manner according to a well known anastigmatism and a well known push-pull method, respectively. The focusing signal is applied to a lens drive means 14 through a focusing servo circuit (not shown) to drive the objective lens 7 in a focusing direction (in a direction perpendicular to the optical disc) for a focus adjustment. On the other hand, the tracking signal is applied to the lens drive means 14 through a tracking servo circuit (not shown) to drive the objective lens 7 in a tracking direction (in a direction radially of the optical disc) for a tracking error compensation. The mirror 6, the objective lens 7 and the lens drive means 14 are mounted on a carriage 15 so that they can be moved in a direction radially of the optical disc in unison with each other to effect a recording or reproduction of information on or from an arbitrary one of tracks on the optical disc.

In general, the optical disc currently used for recording or reproducing information thereon or therefrom has first and second disc surfaces opposite to each other, both of said disc surfaces being utilizable for recording or reproducing information thereon or therefrom. Not only may information be recorded or reproduced from the disc surfaces one at a time, but simultaneous recording and/or reproduction of information on and/or from the double-sided optical disc may also be possible. This type of optical disc is referred to as a double-sided optical disc in contrast to a single-sided optical disc in which information is recorded or reproduced on or from only one disc surface thereof.

However, with the prior art optical head system of the above described construction, information on only one of the opposite disc surfaces of the double-sided optical disc can be recorded or reproduced at a time and, therefore, the optical disc is required to be removed from the recording and/or reproducing apparatus and then to be turned either first or second disc surface down each time information on the second or first disc surface has been reproduced or recorded. Accordingly, the capacity (the on-line capacity) of the optical disc the end user can enjoy concerning a recording or reproduction of information with respect to a single optical disc with no need to wait for a length of time during which the optical disc is turned over is limited to that of a single-sided optical disc.

One may consider the possibility of disposing two optical head systems, each being of the construction shown in FIG. 12, on respective sides of the optical disc so that information can be recorded or reproduced on or from the respective first and second disc surfaces with no need to turn the optical disc over. However, the mere use of the two optical head systems in one optical recording and/or reproducing apparatus brings about a technically difficult problem.

Specifically, when the double-sided optical disc is turned in one direction for information recording or reproduction, the two optical head systems disposed so as to confront the respective first and second disc surfaces "read" the double-sided optical disc as if it were driven in respective directions opposite to each other. Therefore, it may occur that, during the simultaneous reproduction of information from the opposite disc surfaces of the double-sided optical disc, one optical head system would pick up address signals, recorded on one disc surface, in a correct sequence, but the other optical head system would pick up address signals in a reverse sequence. Thus, even though the apparatus using the two optical head systems may be assembled successfully, an electric circuit system used in the apparatus could make use of a set of address signals from only one of the disc surfaces of the double-sided optical disc at a time.

Moreover, the use of the two optical heads in one apparatus renders the latter complicated in structure and bulky in size.

SUMMARY OF THE INVENTION

The present invention has accordingly been devised to substantially eliminate the above discussed problems and is intended to provide an improved optical head assembly capable of recording and/or reproducing information on and/or from a double-sided optical disc simultaneously, which employs a minimized number of component parts for two optical heads and is, therefore, is relatively compact in size and relatively simple in structure.

It is a related object of the present invention to provide an optical disc utilizable in combination with the optical head system of the present invention.

To this end, according to one preferred embodiment of the present invention, an optical head system herein disclosed comprises a source of light for providing a linearly polarized beam of light; a collimator lens for collimating the linearly polarized beam of light into a collimated beam of light; a polarizing direction rotating means for arbitrarily varying a direction of linear polarization of said beam of light; a first polarized beam splitter for dividing the beam, the direction of linear polarization of which has been varied, into first and second beam components; ¼ wavelength plates through which said first and second beam components pass, respectively; objective lenses for focusing the first and second beam components into respective beams of light which are projected onto first and second, opposite disc surfaces of an optical disc; and a second polarized beam splitter for separating rays of light reflected from the respective first and second disc surfaces of the optical disc.

In this optical head system herein disclosed, the first and second beam components are projected onto the first and second disc surfaces of the double-sided optical disc, and signals picked up from the first and second disc surfaces can be extracted in separated relationship with each other.

According to another preferred embodiment of the present invention, there is provided an optical disc having first and second disc surfaces opposite to each other, each of the first and second disc surfaces being formed with spiral grooves on or from which information can be recorded or reproduced. The spiral groove on one of the first and second disc surfaces spirally extends in a direction opposite to that in which the spiral groove on the other of the first and second disc surfaces extends spirally. Specifically, considering the situation in which the optical disc according to the present invention is turned in one direction during information recording or reproduction, the spiral groove on one of the first and second disc surfaces may be viewed as extending clockwise while that on the other of the first and second disc surface may be viewed as extending counterclockwise.

Preferably, the spiral grooves on the respective disc surfaces of the optical disc according to the present invention have address signals recorded thereon, the value of the address signals on the spiral groove on one of the first and second disc surfaces may progressively increase with respect to a clockwise direction while that on the other of the first and second disc surfaces increases similarly with respect to a counterclockwise direction.

Alternatively, each of the first and second disc surface of the double-sided optical disc according to the present invention may have an address signal region defined therein. The address signal region on one of the first and second disc surfaces may have address signals recorded therein in such a sequence that they can be properly read out only when the optical disc is turned clockwise as viewed from the optical head whereas the address signal region on the other of the first and second disc surface may have address signals recorded therein in such a sequence that they can be properly read out only when the optical disc is turned counterclockwise as viewed from the optical head.

Thus, according to the present invention, by rotating the direction of polarization of the laser beam from the light source which has been linearly polarized, P- and S-polarized beam components are generated as the laser beam passes through the first polarized beam splitter with the P- and S-polarized components being transmitted and reflected, respectively, thereby to providing two beam components separated from each other. Accordingly, if those two beam components are focused by the respective objective lenses, two tiny light spots can be formed from the single light source on the first and second disc surfaces simultaneously.

Also, with the optical disc according to the present invention, since the directions in which the respective spiral grooves on the first and second disc surfaces extend are opposite to each other as viewed from the direction in which the light beams are projected, or since the directions in which the values of the address signals on the respective spiral grooves on the first and second disc surfaces progressively increase are opposite to each other with respect to the radial direction of the optical disc, or since the address signals on the respective first and second disc surfaces can be read out even though the first and second disc surfaces rotate in the opposite directions, information recording and/or reproduction can be simultaneously accomplished from the first and second disc surfaces with no need for the user to turn the optical disc over each time information on one of the first and second disc surfaces is to be recorded or reproduced.

BRIEF DESCRIPTION OF THE DRAWINGS

These and other objects and features of the present invention will become clear from the following description taken in conjunction with the accompanying drawings, in which like parts are designated by like reference numerals and in which.

DETAILED DESCRIPTION OF THE EMBODIMENTS

Figure 1A:
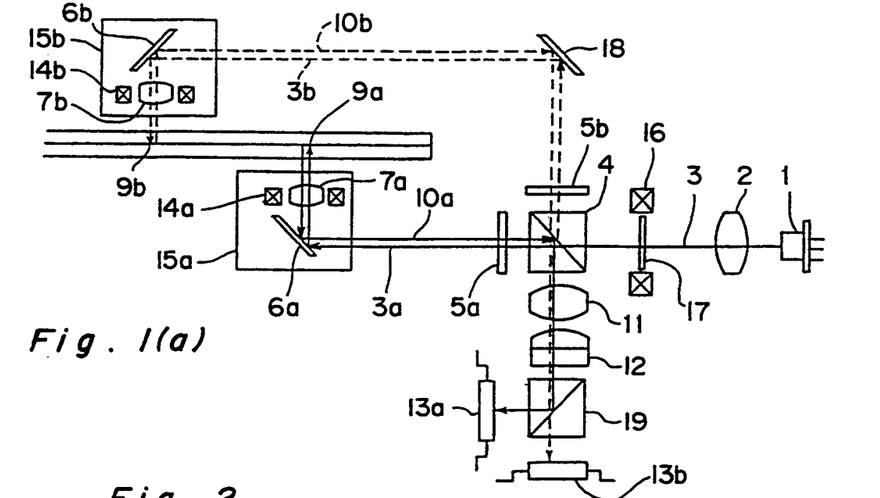
FIG. 1(a) is a schematic side view of an optical head system according to a first preferred embodiment of the present invention.
Figure 1B:
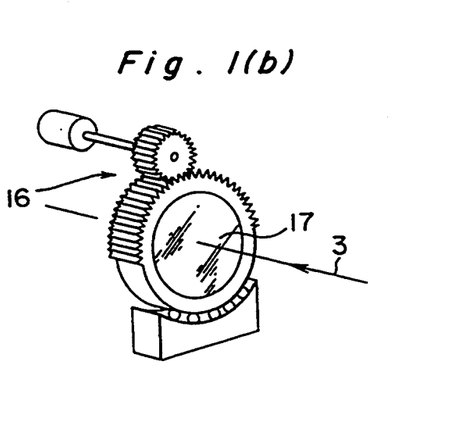
FIG. 1(b) is a perspective view showing a drive unit for rotating a ½ wavelength plate used in the optical head system.

Referring first to FIG. 1, reference numerals 5a and 5b represent respective ¼ wavelength plates; reference numerals 6a and 6b represent respective mirrors; reference numerals 7a and 7b represent respective objective lenses; reference numerals 9a and 9b represent respective light spots; reference numerals 13a and 13b represent respective photosensors; reference numerals 14a and 14b represent respective lens drive units; reference numerals 15a and 15b represent respective carriages; reference numeral 16 represents a drive means for driving a ½ wavelength plate 17; reference numeral 18 represents a mirror; and reference numeral 19 represents a second polarized beam splitter.

Figures 2, 3:
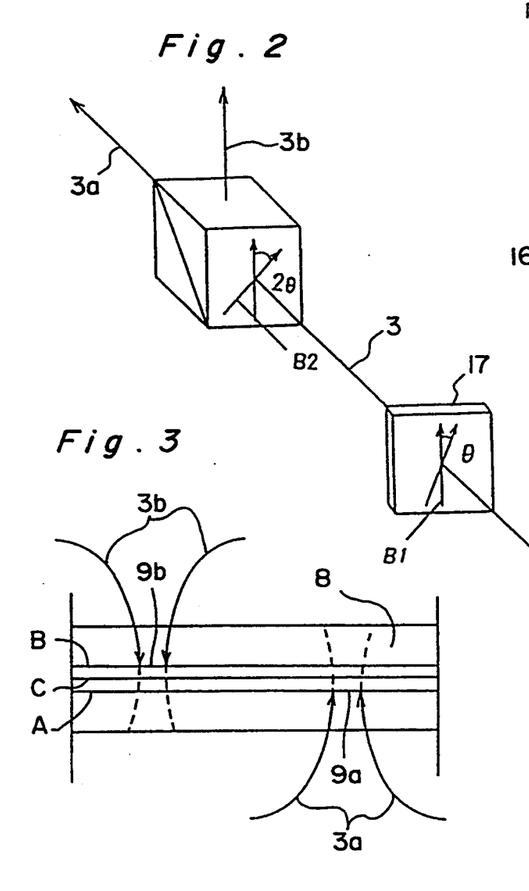
FIG. 2 is a schematic perspective view showing a portion of the optical head system.
FIG. 3 is a side view, on an enlarged scale, of a periphery of an optical disc.

FIG. 2 illustrates, in a perspective representation, an axial relationship between the ½ wavelength plate 17 and the first polarized beam splitter 4, and FIG. 3 illustrates, in a sectional representation and on an enlarged scale, a portion of the optical disc utilized in the practice of the present invention.

A light beam 3 emitted from the semiconductor laser 1 and subsequently transformed into a collimated beam is linearly polarized in a direction parallel to the plane of the drawing of FIG. 1 (in a direction shown by the arrow B1 in FIG. 2) and enters the ½ wavelength plate 17. The ½ wavelength plate 17 is rotated by the drive means 16 so as to have its axis of crystallization inclined at an angle θ relative to the direction B1 shown in FIG. 2. An example of the drive means 16 for the ½ wavelength plate 17 is best shown in FIG. 1(a) and comprises an externally threaded plate mount for the ½ wavelength plate 17, rotatably mounted on a stand on a plurality of cylindrical roller elements, and a motor-driven pinion gear meshed drivingly with a threaded periphery of the plate mount. Accordingly, the light beam 3 having passed through the ½ wavelength plate 17 enters the first polarized beam splitter 4 with its direction of polarization having been rotated an angle of 2θ as shown by the arrow B2 in FIG. 2.

As the light beam 3 enters the first polarized beam splitter 4, it is divided to provide beam components 3a and 3b of different intensities. The proportion of the intensity of the components into which the light beam 3 is divided is such that the intensity of the beam component 3a transmitted through the first polarized beam splitter 4 and that of the beam component 3b reflected by the first polarized beam splitter 4 can be expressed by I·cos (2θ) and I·sin (2θ), respectively, wherein I represents the intensity of the light beam 3 entering the first polarized beam splitter 4. In other words, by selecting the angle θ of rotation of the axis of crystal of the ½ wavelength plate 17 effected by the drive means 16, the single laser beam can be divided into the beam components of respective intensities in an arbitrary proportion. The two beam components 3a and 3b so divided as hereinabove described are guided to associated first and second optical systems for recording or reproducing information on and from A-side and B-side faces of the optical disc as will be described later with particular reference to FIG. 3.

The beam component 3a used to record or reproduce information on or from the A-side face of an optical disc 8 is, after having passed through the ¼ wavelength plate 5a, deflected by the mirror 6a so as to travel along a path extending generally perpendicular to the optical disc 8 and is then focused by the objective lens 7a to form the light spot 9a on the optical disc 8.

A sectional representation, on an enlarged scale, of the optical disc 8 is shown in FIG. 8. The optical disc 8 has the A-side and B-side faces opposite to each other and on respective sides of a separating layer C situated intermediate therebetween, and the light spot 9a referred to above is used to record or reproduce information on or from the A-side face thereof. Since the beam component 3a transmitted through the A-side face of the optical disc 8 is sufficiently diffused before it reaches the B-side face of the optical disc 8, a recording or reproduction of information on or from the B-side face of the optical disc 8 is not adversely affected.

On the other hand, the beam 10a reflected from the optical disc 8 is, after having passed through the objective lens 7a and then through the mirror 6a, transmitted to the ¼ wavelength plate 5a by which it is transformed into a S-polarized light which is subsequently reflected by the first polarized beam splitter 4. The beam 10 reflected by the first polarized beam splitter 4 is subsequently detected by the photosensor 13a after having been converged by the sensor lens 11 and the cylindrical lens 12 and then reflected by the second polarized beam splitter 19. The photosensor 13a is operable to detect a reproduced signal reproduced from the optical disc 8 and also to detect a focusing signal and a tracking signal in any known manner according to the known anastigmatism and the known push-pull method, respectively.

The focusing signal detected by the photosensor 13a according to the known anastigmatism is applied to the lens drive means 14a through a focusing servo circuit (not shown) to control the movement of the objective lens 7a in a focusing direction (in a direction perpendicular to the optical disc). On the other hand, the tracking signal detected by the photosensor 13a according to the known push-pull method is applied to the lens drive means 14a through a tracking servo circuit (not shown) to control the objective lens 7a in a tracking direction (in a direction radially of the optical disc). The mirror 6a, the objective lens 7 and the lens drive means 14a are all mounted on the carriage 15a for movement in a direction radially of the optical disc 8 to record or reproduce information on or from an arbitrary track on the optical disc 8.

A second optical system used to record or reproduce information on or from the B-side face of the optical disc 8 is substantially identical with that used to record or reproduce information on or from the A-side face of the optical disc 8 as described above, and therefore, parts of the optical system associated with the B-side face of the optical disc 8 which are like to those associated with the A-side face of the optical disc 8 are designated by like reference numerals in which the suffix "a" is replaced with a suffix "b". However, the first and second optical systems associated respectively with the A-side and B-side faces of the optical disc 8 differ from each other in that, in the second optical system, the beam 10b reflected from the optical disc 8 so as to travel towards the first polarized beam splitter 4 is P-polarized whereas, in the first optical system, the beam 10a is S-polarized as hereinbefore described. Accordingly, both means are, after having been synthesized by the first polarized beam splitter 4, separated by the second polarized beam splitter 12 and are then guided to the associated photosensors.

Where the A-side face of the optical disc 8 is recorded with the use of the optical head system constructed according to the present invention as described above, the angle θ of rotation of the ½ wavelength plate is adjusted to approach zero, while where the B-side face of the optical disc 8 is similarly recorded, the angle θ of rotation of the ½ wavelength plate is so adjusted to approach 45 degrees. By so doing, a relatively high power can be given to each of the A-side and B-side Faces of the optical disc 8 and information recording is possible on both side Faces of the optical disc 8 with no need for the optical disc 8 to be turned either A-side Face down or B-side Face down. By way of example, if the angle $\theta$ of rotation of the ½ wavelength plate is selected to be 9 degrees, about 90% of the total power of the laser beam emitted from the semiconductor laser can be transmitted to the A-side face of the optical disc for information recording, and the remaining 10% thereof is utilized to radiate the B-side face of the optical disc to allow the light spot 9b to be resident on the B-side face thereof with neither focusing control nor tracking control interrupted. Conversely, if the angle $\theta$ of rotation of the ½ wavelength plate is selected to be 36 degrees, 90% of the total power of the semiconductor laser beam can be transmitted to the B-side face of the optical disc for information recording and the remaining 10% thereof is used to radiate the A-side face in a wait mode.

If, however, the angle $\theta$ of rotation of the ½ wavelength plate is selected to be 22.5 degrees, the total power of the semiconductor laser beam can be divided into equal proportions and, therefore, should the semiconductor laser be capable of producing a reproduction light of a power twice the power required to reproduce information from either side of the optical disc, simultaneous information reproduction from both of the A-side and B-side faces of the optical disc will be possible.

Figure 4A:
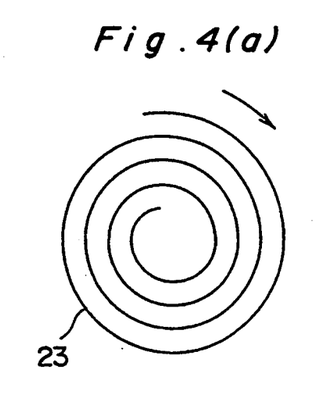
FIGS. 4(a) and 4(b) are schematic diagrams showing spiral grooves formed on A-side and B-side faces of the optical disc according to one embodiment.
Figure 4B:
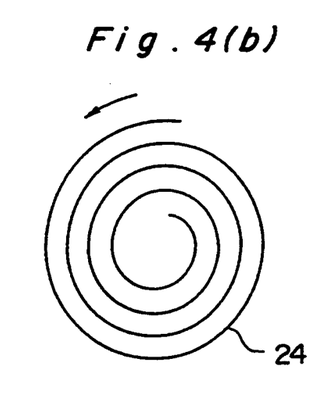
Figure 5A:
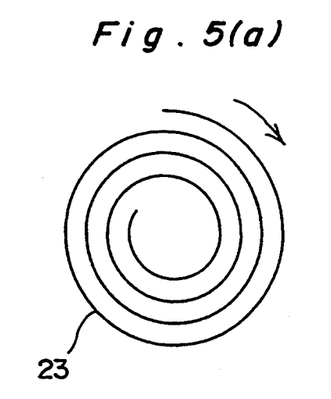
FIGS. 5(a) and 5(b) are schematic diagrams showing spiral grooves formed on A-side and B-side faces of the optical disc according to another embodiment.
Figure 5B:
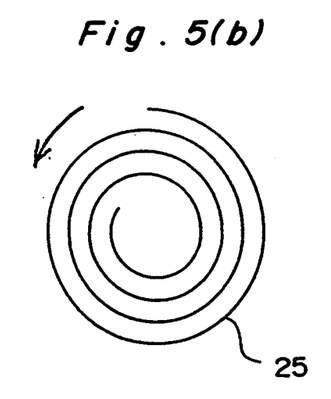

The details of the optical disc 8 employed according to the present invention will now be described. In general the optical disc capable of being recorded and/or reproduced has a known spiral groove formed on each of the A-side and B-side faces and information can be recorded on or reproduced from the spiral groove. FIGS. 4 and 5 illustrate respective layouts of two examples of the spiral grooves on the A-side and B-side faces, which are shown in front elevational representation as viewed in a direction conforming to the direction in which the associated light beams are projected onto the A-side and B-side faces. In those figures, arrow-headed lines represent respective directions in which the light spots move relative to the optical disc.

According to the optical head system shown in and described with reference to FIG. 1 which is so designed as to substantially eliminate the necessity of the optical disc to be turned over each time information has been recorded on or reproduced from one of the opposite side faces of the optical disc, the A-side and B-side faces of the optical disc can be viewed as turning in respective directions opposite to each other during a rotation of the optical disc about a given axis of rotation. Therefore, in the example of FIG. 4, the spiral groove 23 on the A-side face of the optical disc extends clockwise about the axis of rotation of the optical disc, as shown in FIG. 4(a), when viewed in a direction conforming to the direction in which the light beam is projected onto the A-side face, whereas the spiral groove 24 on the B-side face of the optical disc extends counterclockwise about the same axis of rotation of the optical disc, as shown in FIG. 4(b), when viewed in a direction conforming to the direction in which the light beam is projected onto the B-side face. Once the directions in which the respective spiral grooves extend are so determined, the optical heads necessarily scan the respective side faces radially inwardly from an outer periphery thereof. On the other hand, if the direction of rotation of the optical disc is reversed, it is possible to cause the optical heads to scan the associated side faces radially outwardly from an inner periphery thereof.

Where the spiral grooves on the A-side and B-side faces of the optical disc extend in the same direction, the optical heads have to be moved radially inwardly from an outer periphery of the A-side face and radially outwardly from an inner periphery of the B-side face, respectively, as shown in FIG. 5. Accordingly, if the A-side and B-side faces of the optical disc are so formatted as to permit the value of address signal to increase radially inwardly from the outer periphery thereof and radially outwardly from the inner periphery thereof, respectively, the optical heads can start scanning the respective side faces of the optical disc in a direction from the smallest value of the address signals towards the greatest value thereof. As can readily be understood from FIGS. 4 and 5, in order for the simultaneous information reproduction to be accomplished, the optical heads scan the spiral grooves on the A-side and B-side faces of the optical disc in clockwise and counterclockwise directions, respectively, and, therefore, it is necessary for those side faces of the optical disc to be designed that the address signals can be read in the respective directions.

Examples of address signal regions formed on the double-sided optical disc according to the present invention are shown in FIGS. 6 to 9.

Figure 6A:
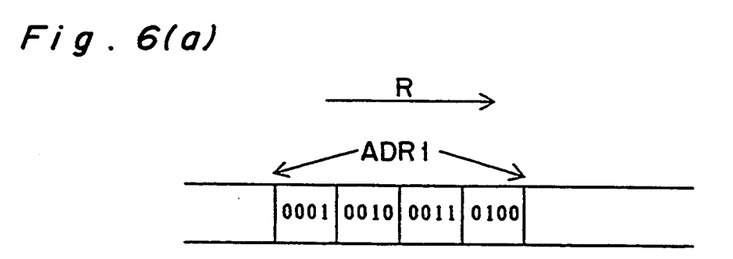
FIGS. 6(a) and 6(b) are diagrams showing one example of address signals formed in the optical disc according to the present invention.
Figure 6B:
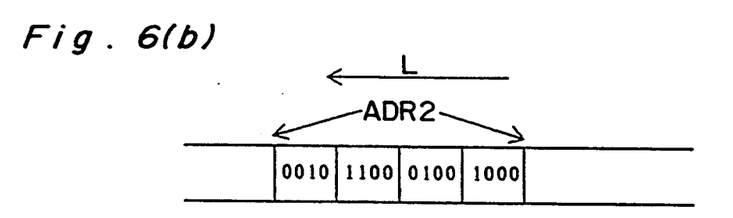

FIG. 6 illustrates one example of the address signal format, wherein FIG. 6(a) illustrates that in the spiral groove on the A-side face and FIG. 6(b) illustrates that in the spiral groove on the B-side face. In FIGS. 6(a) and 6(b), where the information on the A-side and B-side faces of the double-sided optical disc is desired to be reproduced simultaneously, the optical head scans the A-side and B-side faces in respective directions as indicated by R and L. Reference characters ADR1 and ADR2 represent address signals indicative of 1234 address locations recorded on the optical disc. By way of example, each address signal ADR is comprised of four areas each weighed 1, 2, 3 or 4 in four-bit representation.

As far as the A-side face of the optical disc is concerned, the address locations of 1, 2, 3 and 4 can be read out in proper sequence only when the associated optical head scans in the direction R and will not be reproduced as an address location if it scans in a direction opposite to the direction R. Similarly, as far as the B-side face thereof is concerned, the address locations of 1, 2, 3 and 4 can be read out in proper sequence only when the associated optical head scans in the direction L and will not be reproduced if it scans in a direction opposite to the direction L. Thus, according to the present invention, since the address signals are recorded in the opposite directions on the A-side and B-side faces of the optical disc, respectively, it is possible to reproduce information simultaneously from both side faces of the double-sided optical disc with the use of, for example, the optical head system shown in FIG. 1.

Figure 7A:
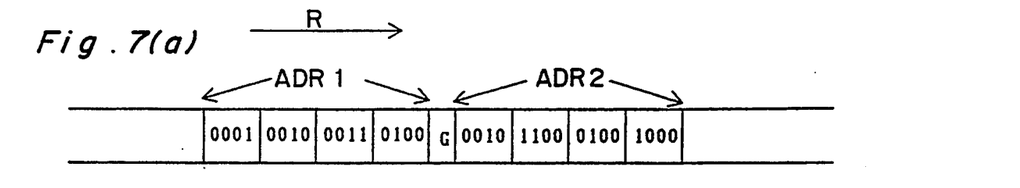
FIGS. 7(a) and 7(b) are diagrams showing another example of address signals formed in the optical disc according to the present invention.
Figure 7B:
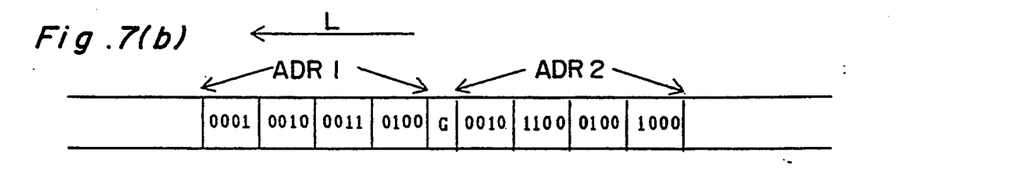

FIG. 7 illustrates another example of the address signal format, wherein FIG. 7(a) illustrates that in the spiral groove on the A-side face and FIG. 7(b) illustrates that in the spiral groove on the B-side face. In this example, each of the side faces of the double-sided optical disc is provided with ADR1 and ADR2 having an identical address signal format. Where information is desired to be reproduced simultaneously from the A-side and B-side faces of the double-sided optical disc, the A-side face is scanned in the direction R and, therefore, the address signals of 1, 2, 3 and 4 can be reproduced From ADR1. Since a gap G is provided between ADR1 and ADR2, a reproduction of the address signals is interrupted at the gap G and ADR2 will no longer be reproduced. While the gap G has been described as a location at which the address signal reproduction is cancelled, a signal indicative of the end of the address signal may be provided following each ADR. As far as the B-side face of the double-sided optical disc is concerned, since the B-side face is scanned in the direction L, the address signals of 1, 2, 3 and 4 can be reproduced from ADR2 and, for a reason similar to that described above, the address signals will not be reproduced From ADR1. By way of example, where the address signal region of the above described format is provided in the spiral groove shown in FIG. 5, such an effect can be obtained wherein the A-side and B-side faces of the optical disc are comprised of an identical substrate and simultaneous information reproduction from both side faces thereof is possible.

Figure 8A:
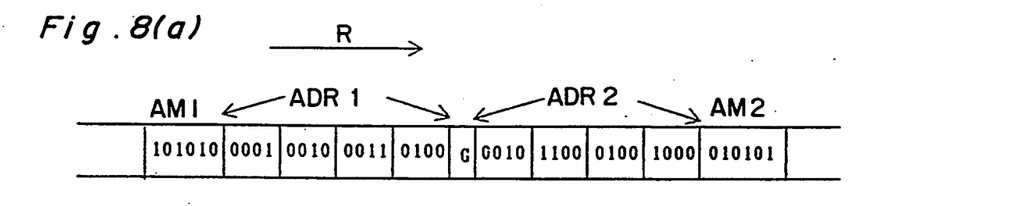
FIGS. 8(a) and 8(b) are diagrams showing a further example of address signals formed in the optical disc according to the present invention.
Figure 8B:
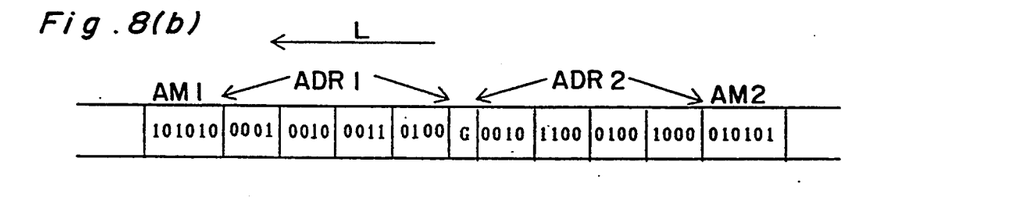

FIG. 8 illustrates a further example of the address signal format, wherein FIG. 8(a) illustrates that in the spiral groove on the A-side face and FIG. 8(b) illustrates that in the spiral groove on the B-side face. In the address signal format of FIG. 8, address markings AM1 and AM2 are provided preceding ADR1 and ADR2, respectively. In this example, a compromise is made that the direction opposite to the direction in which ADR1 and ADR2 can be properly read out precedes each address marking. The address markings AM1 and AM2 represent respective signals each indicative of the start of the associated address signal and will be signals, for example, a 101010 signal, that can be read out in proper sequence only in the direction R or the direction L respectively.

In this format, in order for the information to be reproduced simultaneously from the opposite side faces of the double-sided optical disc, since the spiral groove on the A-side face is scanned in the direction R, AM1 will be determined to be the address marking and the address locations of 1, 2, 3 and 4 can be reproduced by the subsequent ADR1. ADR2 has no address marking and will not therefore be reproduced as an address. ON the other hand, since the spiral groove on the B-side face is scanned in the direction L, AM2 will be determined to be an address marking and the address locations of 1, 2, 3 and 4 can be reproduced by the subsequent ADR2. ADR1 has no address marking and will not therefore be reproduced. With this format shown in FIG. 8, even though the identical address signals are provided on the A-side and B-side faces of the double-sided optical disc, there is no possibility that the addresses in the opposite directions will be erroneously read out.

Figure 9A:
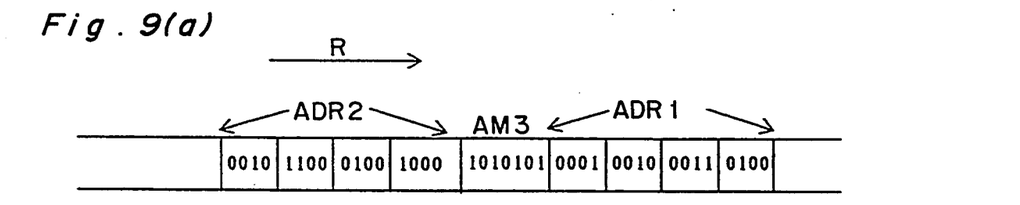
FIGS. 9(a) and 9(b) are diagrams showing a yet further example of address signals formed in the optical disc according to the present invention.
Figure 9B:
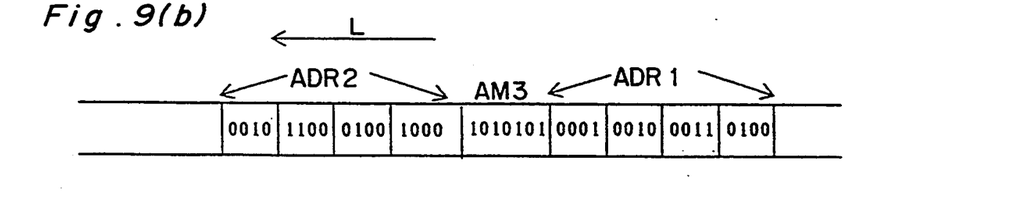

FIG. 9 illustrates a still further example of the address signal format, wherein FIG. 9(a) illustrates that in the spiral groove on the A-side face and FIG. 9(b) illustrates that in the spiral groove on the B-side face. In the address signal format of FIG. 9, an address marking AM3 is provided between ADR2 and ADR1. The address marking AM3 is an address marking signal which can be read in either of the directions R and L, for example, a 101010 signal.

In this format, in order for the information to be reproduced simultaneously from the opposite side faces of the double-sided optical disc, since the spiral groove on the A-side face is scanned in the direction R, AM3 will be determined to be the address marking and the address locations of 1, 2, 3 and 4 can be reproduced by the subsequent ADR1. ADR2 will not be reproduced because it has no address marking. ON the other hand, since the spiral groove on the B-side face is scanned in the direction L, AM3 will be determined to be an address marking and the address locations of 1, 2, 3 and 4 can be reproduced by the subsequent ADR2. ADR1 will not be reproduced because it has no address marking. This format shown in FIG. 9 brings about an effect that the address signals can be read from the opposite direction with a single address marking.

Figure 10:
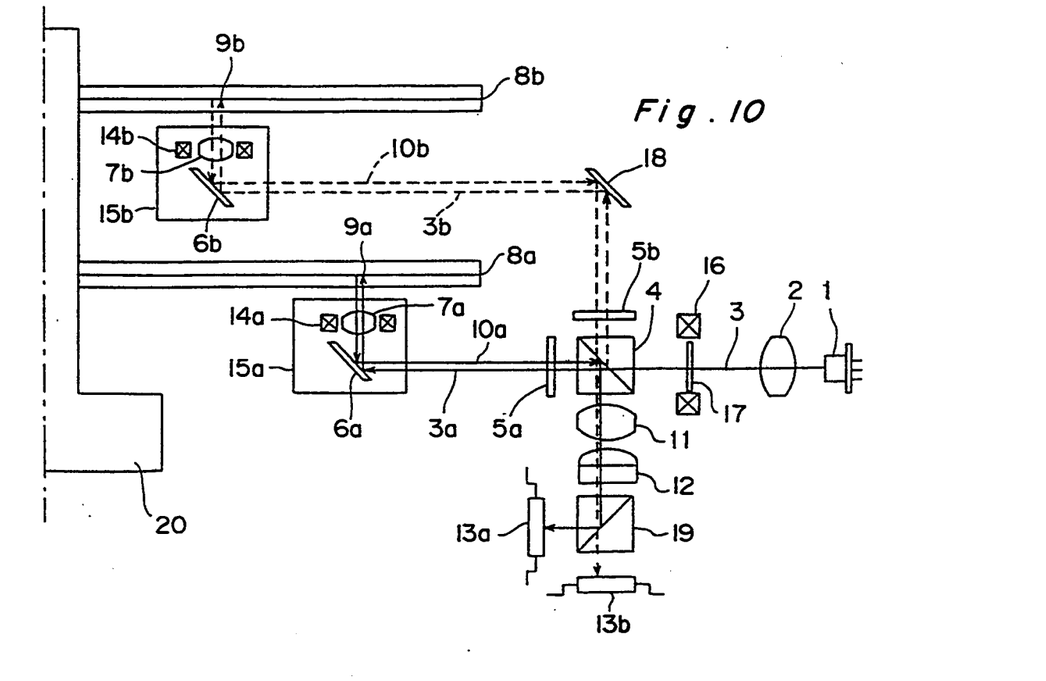
FIGS. 10 and 11 are schematic side views of the optical head system according to second and third preferred embodiments of the present invention.

Another embodiment of the optical head system according to the present invention is shown in FIG. 10. The optical head system shown in FIG. 10 is substantially identical with that shown in FIG. 1, except that in the system of FIG. 10 two optical discs shown by 8a and 8b, respectively, are mounted on a spindle drivingly coupled and a motor 20 with the two optical heads are used to scan one side face of the respective optical discs 8a and 8b from below.

According to the system of FIG. 10, information recording and reproduction on and from the two optical discs 8a and 8b are possible with no need to replace the optical disc, which has been recorded or reproduced, with the optical disc to be reproduced or recorded. Since the optical heads "read" the respective optical discs 8a and 8b turning in the same direction, the spiral groove on one of the optical discs 8a and 8b may extend in the same direction as that on the other of the optical discs 8a and 8b. In other words, the optical disc utilizable with the system of FIG. 10 need not be always limited to that shown in and described with reference to any one of FIGS. 4 and 5.

Figure 11:
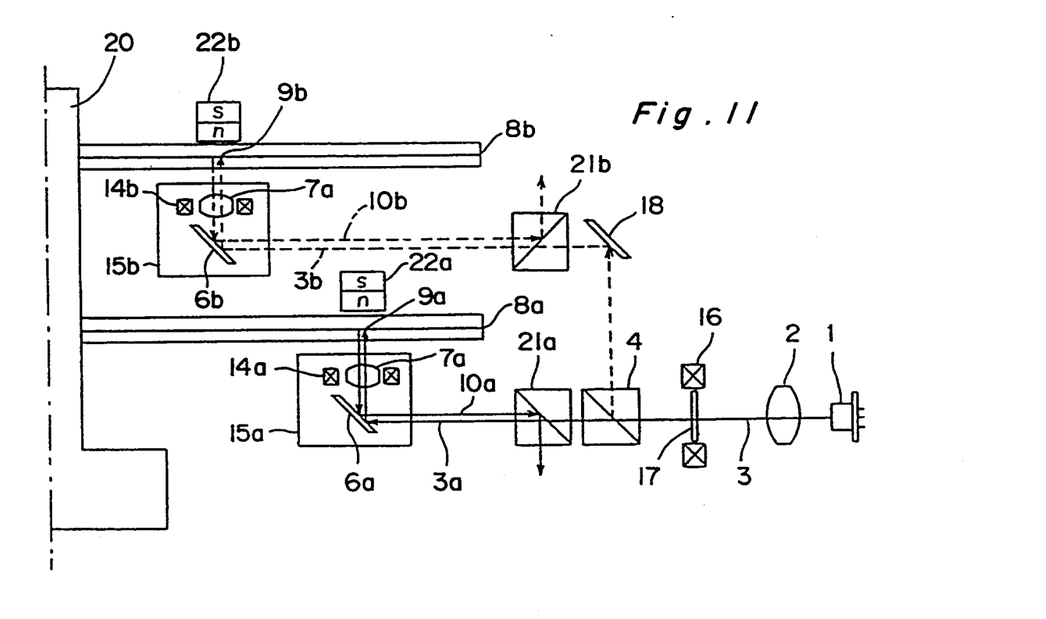

FIG. 11 illustrates a further embodiment of the optical head system according to the present invention. As a relatively recent version of an optical disc, a re-writable magneto-optical disc is well known. With this magneto-optical disc, information can be reproduced from recording pits by the utilization of a change in Kerr's angle of rotation. Accordingly, when it comes to the information reproduction from the magneto-optical disc, the light beam to be projected onto the magneto-optical disc has to be a linearly polarized beam. The optical head system shown in FIG. 11 is designed to utilize such a magneto-optical disc.

Referring now to FIG. 11, the beam components 3a and 3b emerging from the first polarized beam splitter 4 are, after having passed through respective dividing mirrors 21a and 21b, focused on the associated optical disc 8a and 8b. Each of the dividing mirrors is a mirror merely operable to divide the light power into suitable proportions (for example, 60% transmitted and 40% reflected) and the linearly polarized nature of the light beam remains unchanged. Beam components reflected from the respective optical discs are in part reflected by the dividing mirrors and are subsequently utilized to reproduce signals magneto-optically after having been passed through any known optical system.

Reference numerals 22a and 22b represent respective external magnets used for writing or erasing signals on or from the magneto-optical discs. As is the case with the embodiment of FIG. 10, the system of FIG. 11 is advantageous in that information writing and erasure on and from the two magneto-optical discs are possible with no need to replace the magneto-optical disc, which has been recorded or erased, with the optical disc to be erased or recorded. Also, if each external magnet is positioned on one side of the associated magneto-optical disc adjacent to the corresponding optical head, i.e., at a position opposite to that shown in FIG. 11, the optical head system of FIG. 11 can be used in a manner similar to that shown in and described with reference to FIG. 1.

As hereinbefore described, the present invention is such that the rotation of the direction of polarization of the light beam from the light source can result in a separation of the light beam into the two beam components which are subsequently utilized to form a tiny light spot on the opposite disc surfaces of one optical disc. Also, an arbitrary selection of the angle of rotation of the polarized direction can determine the proportion of the light intensities (light powers) of the two beam components in an arbitrary ratio, and it is possible to use them for recording and reproducing information on and from the opposite disc surfaces, respectively, or for accomplishing simultaneous reproduction of information from the opposite disc surfaces. Since the two beam components are separated merely by the rotation of the polarizing direction and no other optical component is moved, the optical axes of the respective two beam components will not displace from each other even when a recording face (in other words, the power) is changed. In addition, since the rotation of the ¼ wavelength plate through which the light beam passes results in a rotation of the linear direction, it will not often occur that the optical axis of the light beam varies relative to the rotation in the case of transmitted rays of light.

Furthermore, the use of the ¼ wavelength plate and the second polarized beam splitter according to the present invention makes it possible to separate and extract signals from the opposite disc surfaces, respectively.

Also, the use of the dividing mirror in the optical head system according to the present invention makes it possible to extract reproduced signals simultaneously from the respective disc surfaces of the two magneto-optical discs.

Yet, the optical disc according to the present invention is such that the spiral groove on one of the first and second disc surfaces spirally extends in a direction opposite to that in which the spiral groove on the other of the first and second disc surfaces extends spirally. Therefore, it is possible to accomplish a double-sided information recording and reproduction with no need to turn the optical disc over.

Moreover, the optical disc according to the present invention is such that the spiral grooves on the respective disc surfaces of the optical disc have address signals recorded thereon, the value of the address signals on the spiral groove on one of the first and second disc surfaces may progressively increase with respect to a clockwise direction while that on the other of the first and second disc surfaces increases similarly with respect to a counterclockwise direction, or alternatively, each of the first and second disc surfaces of the double-sided optical disc may have an address signal region defined therein. The address signal region on one of the first and second disc surfaces may have address signals recorded therein in such a sequence that they can be properly read out only when the optical disc is turned clockwise as viewed from the optical head whereas the address signal region on the of the first and second disc surface may have address signals recorded therein in such a sequence that they can be properly read out only when the optical disc is turned counterclockwise as viewed from the optical head. Therefore, the double-sided information recording and reproduction can be accomplished with no need to turn the optical disc over.

Although the present invention has been fully described in connection with the preferred embodiments thereof with reference to the accompanying drawings, it is to be noted that various changes and modifications will be apparent to those skilled in the art. Such changes and modifications are to be understood as included within the scope of the present invention as defined by the appended claims, unless they depart therefrom.

What is claimed is:

1. An optical disc having first and second disc surfaces on opposite sides thereof, each of said first and second disc surfaces having a spiral groove or coaxial grooves defined thereon whereby signals can be recorded on or read from opposite sides of the disc simultaneously by optical recording/reading means opposed to opposite sides of said disc, the grooves in each of said disc surfaces further having an address signal region, said address signal region on each of said first and second disc surfaces being symmetrically positioned to the address signal region on the opposite side of said disc and having first and second sets of address signals recorded therewithin, the address signals of said first set having parts which differ from each other and being in a sequence readable as an address indicator by an optical head adjacent the first disc surface and forming part of an optical recording/reading means for recording on or reading signals from the first surface and in a fixed position past which the disc moves when the optical disc is rotated, said parts of said first set being readable as said address indicator by the optical head only in one of clockwise and counterclockwise directions as viewed from the optical head, and the address signals of said second set having parts which differ from each other and being in a sequence readable as said address indicator by an optical head adjacent the second disc surface and forming part of an optical recording/reading means for recording on or reading signals from the second surface and in a fixed position past which the disc moves when the optical disc is rotated, said parts of said second set being readable as said address indicator by the optical head only in the other of the clockwise and counterclockwise directions as viewed from the optical head.

2. An optical disc as claimed in claim 1 further comprising an address marking signal within said address signal region for each of said address signals and positioned preceding, relative to the direction in which the disc is rotated for making the succeeding address signal readable, each address signal.

3. An optical disc as claimed in claim 2 in which the respective address signals of the first and second sets are positioned adjacent to each other with an address marking signal therebetween.

* * * * *